United States Patent
Kawasaki et al.

(10) Patent No.: US 6,386,364 B2
(45) Date of Patent: *May 14, 2002

(54) WELDING WIRE CHARGE

(75) Inventors: Zenji Kawasaki; Tadami Ashidate, both of Hikari; Yasuhiko Hashida, Tokyo; Kenji Ryoke, Tokyo; Hiroshi Yoshida, Tokyo, all of (JP)

(73) Assignee: Nippon Steel Welding Products & Engineering Co., Ltd., Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/380,708
(22) PCT Filed: Jan. 29, 1998
(86) PCT No.: PCT/JP98/00372
  § 371 Date: Sep. 8, 1999
  § 102(e) Date: Sep. 8, 1999
(87) PCT Pub. No.: WO99/38789
  PCT Pub. Date: Aug. 5, 1999

(51) Int. Cl.⁷ .............................................. B65D 85/66
(52) U.S. Cl. ...................................... 206/408; 206/397
(58) Field of Search ................................ 206/408, 397, 206/398, 413

(56) References Cited

FOREIGN PATENT DOCUMENTS

| | | | |
|---|---|---|---|
| EP | 0584056 A1 | * | 2/1994 |
| JP | 58-170344 | | 11/1983 |
| JP | 59-8474 | | 2/1984 |
| JP | 61-157567 | | 9/1986 |
| JP | 62-111872 | * | 5/1987 |
| JP | 2-29092 | | 8/1990 |
| JP | 3-133579 | * | 6/1991 |
| JP | 4-912 | | 1/1992 |
| JP | 4-112170 | | 4/1992 |
| JP | 0519424 A1 | * | 12/1992 |
| JP | 6-211428 | | 8/1994 |
| JP | 2000-72331 | * | 3/2000 |
| JP | 2000-95437 | * | 4/2000 |
| JP | 2000-202630 | * | 7/2000 |

* cited by examiner

Primary Examiner—Shian Luong
(74) Attorney, Agent, or Firm—Wenderoth, Lind & Ponack, L.L.P.

(57) ABSTRACT

This invention offers welding wire packages without twining and tangling even if welding wire is drawn out from pail containers at high speed, and also without bending of the wire. Namely, in a welding wire package in which welding wire with torsion around an axis of the welding wire is coiled, a wire pressing member is disposed on top of the coiled wire, wherein the wire pressing member comprises a wire pressing part for pressing the coiled welding wire, and a wire guiding part having a hole of not more than 180 mm in diameter in a center of the wire pressing member for passage of the welding wire.

24 Claims, 5 Drawing Sheets

WELDING WIRE CHARGE

FIELD OF THE INVENTION

The present invention relates to a package of welding wire such as solid wire or flux-cored wire, wherein the wire is coiled, with torsion around an axis of the welding wire in a pail container.

BACKGROUND ART

Pail containers are commonly used for large capacity reservoirs which accommodate 200 to 300 kg of welding wire. In the pail container the welding wire is coiled with torsion around an axis of the welding wire within its elasticity limit stress, for instance, 270 to 360 degrees per one loop of the wire. Thus, the welding wire in the pail container includes a force to release the torsion. Therefore, when the wire is not restricted, the wire has a tendency to jump toward an axial direction of the pail container. This frequently causes twining and tangling of the wire when drawing out the wire from the pail container. For solving this problem it is known, as described in Japanese published patent No. Sho 59-8474, that an annular pressing plate can be placed on the coiled welding-wire loops to push the wire downward.

FIG. 5 shows a cross-sectional view of welding wire filled in a pail container as shown in above mentioned Japanese published patent No. Sho 59-8474, wherein the wire is coiled in layers with torsion around an axis of the welding wire, and then drawn out from the pail container 1. The welding wire 5 forms a cylindrical cavity 4 inside the coiled wire 2. On the top of the coiled wire 2 an annular pressing plate 8 is placed for preventing the welding wire from jumping. In this case, an inner diameter of the annular pressing plate is slightly smaller than an inner diameter of the coiled wire, as necessary. The annular pressing plate is large enough for pushing the coiled wire. For instance, when inner diameters of ordinary pail containers are 500 mm or 650 mm, the inner diameter of the coiled wire is 340 to 460 mm, and annular pressing plates having inner diameters of 230 to 350 mm are adopted.

In the process of drawing out welding wire from a pail container in FIG. 5, the welding wire 5 is drawn out upwardly, wherein a separation point of the wire from the coiled wire 2 travels along the inner edge 9 of the annular pressing plate 8 at the top of the coiled wire 2. FIG. 6 is a plan view of a part of the pail container shown in FIG. 5, wherein a few turns of wire at the top of the coiled wire 2 are especially shown. Because the separation point of the welding wire 5 rotates along the inner edge 9 of the annular pressing plate 8, the welding wire is drawn out while being in contact with a next loop 10 nearly parallel thereto, and while traveling along the inner edge 9 of the annular pressing plate 8. Consequently, the annular pressing plate is slightly lifted when welding wire is drawn out at high speed, or rigidity of the welding wire is high. This may cause twining and tangling of the welding wire when the next loop 10, and moreover the succeeding loops 11, are drawn out into the cylindrical cavity 4 and the wire springs up in the cylindrical cavity due to release of the torsion around an axis of the welding wire.

DISCLOSURE OF THE INVENTION

In consideration of the above mentioned current status, the present invention is intended to offer a welding wire package which does not have the problem of twining and tangling even if welding wire is drawn out at high speed, or rigidity of the welding wire is high, and also which attains smooth feeding of welding wire to a welding location without bending of the wire.

Namely, the present invention is a welding wire package wherein welding wire with torsion around an axis of the welding wire is coiled in a pail container while a cylindrical cavity is defined therein. A wire pressing member is disposed on top of the coiled wire. The wire pressing member comprises a pressing part for pressing the coiled welding wire, and a wire guiding part having a hole of not more than 180 mm in diameter in a center of the wire pressing member for passage of the welding wire.

As a most preferable embodiment, the diameter of the hole of the wire guiding part is not less than 0.55T+10 (mm), where rupture strength of the welding wire is T (kgf). Also, a ratio W/T is in a range of 4 to 32, where weight of the wire pressing member is W (g) and rupture strength of the welding wire is T (kgf).

BEST MODE FOR CARRYING OUT THE INVENTION

Figure 1:
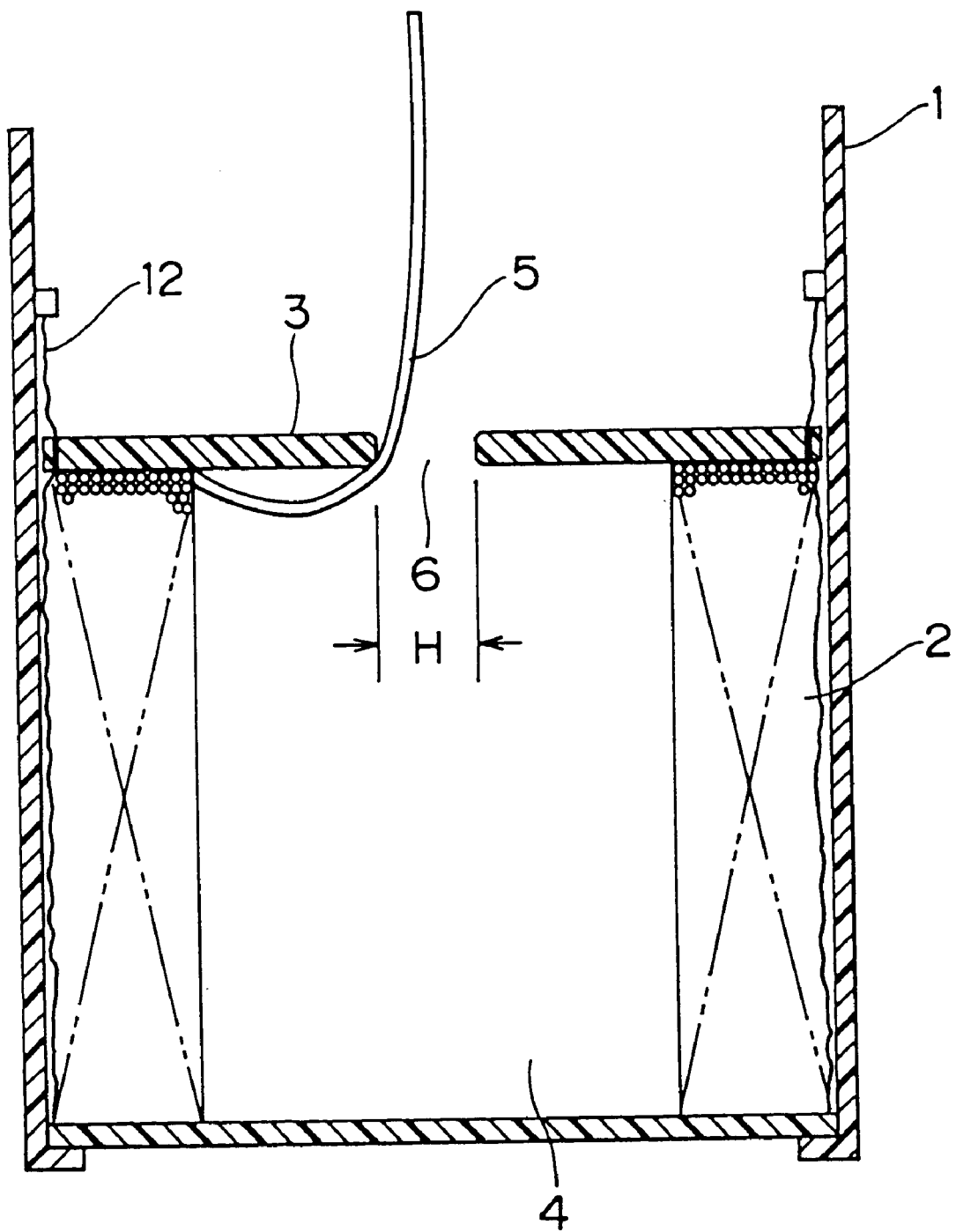
FIG. 1 is a cross-sectional view of a welding wire package of the present invention while wire is being drawn out from a pail container.

The present invention will be explained by referring to the attached drawings. An example of a welding wire package of the present invention is shown in FIG. 1. FIG. 1 is a cross-sectional view of a welding wire package while wire is being drawn out from a pail container 1, in which the wire is coiled with torsion around an axis of the welding wire. A circular pressing plate 3 is placed on the coiled wire 2 to prevent the wire from jumping up. The circular pressing plate 3 of this invention has a wire drawing-out hole 6 in its center. Namely, in this invention the circular pressing plate 3 has a function not only for pressing the coiled wire 2, but also for regulating wire drawing-out through its center. Also, 12 identifies string members which prevent the welding wire from jumping out through a gap between an inner wall of the pail container 1 and the pressing plate 3. The same effect is attained by a pressing plate 3 equipped with spring members in contact with the inner wall of the pail container 1, instead of the string members 12.

Figure 2:
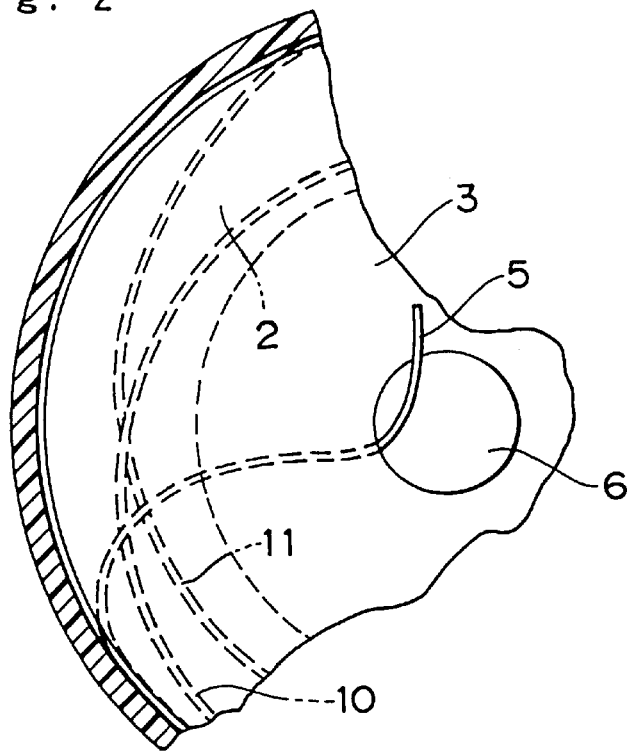
FIG. 2 is a plan view of a part of FIG. 1.
Figure 3:
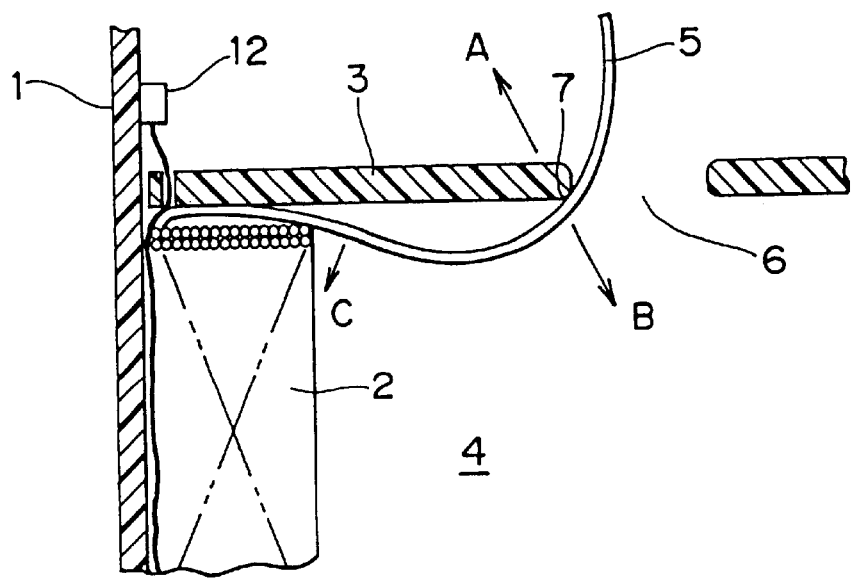
FIG. 3 is an enlargement of a part of FIG. 1.

FIG. 2 is a plan view of a part of the pail container shown in FIG. 1, wherein a few turns of wire at the top of the coiled wire 2 are especially shown. Also, FIG. 3 is an enlargement of a part of FIG. 1. In the present invention, because a wire drawing-out hole 6 is located at the central part of the pressing plate 3, the loop of wire just being drawn out is expanded until it contacts the inner wall of the pail container, due to rigidity of the welding wire with torsion around an axis of the welding wire. Accordingly, the welding wire is drawn out from the contact point at the inner wall of the pail container toward the wire drawing-out hole 6, then the wire traverses the next loop 10 and the succeeding loops 11.

Therefore, the loop of wire just being drawn out is not parallel to the next loop and the succeeding loops 11. Then loops of wire are individually drawn out into the cylindrical cavity 4.

Also, the welding wire 5 is drawn out from the wire drawing-out hole 6 upwardly, because a wire drawing-out device or a wire drawing-out guide, which is not shown in FIG. 1 or FIG. 3, is installed over the wire drawing-out hole 6. Therefore, as shown in FIG. 3, the welding wire exerts a force in the direction of arrow B due to a tension of being drawing out, wherein a portion 7 of the wire drawing-out hole 6 in the center of the pressing plate 3 functions as a fulcrum. Then, the welding wire 5 in the cylindrical cavity 4 becomes arched between the contact point at the inner wall of the pail container 1 and the portion 7 of the wire drawing-out hole 6. This arched welding wire exerts a force in the direction of C, so that the wire is drawn out while pressing the next loop and the succeeding loops. Consequently, the succeeding loops are not drawn into the cylindrical cavity, even if the wire is drawn out at high speed or the pressing plate 3 is slightly lifted. Therefore, the welding wire 5 drawn out from under the circular pressing plate 3 does not twine or tangle itself.

In order to obtain the above explained effect, a diameter of the wire drawing-out hole of the circular pressing plate should be not more than 180 mm, preferably not more than 150 mm. If the diameter of the wire drawing-out hole exceeds 180 mm, the force which causes the portion 7 of the wire drawing-out hole to function as a fulcrum is small. Therefore, the next loop 10 and the succeeding loops 11 cannot be suppressed. Also, the loop of wire just being drawn out may touch in parallel with the succeeding loops 11, thereby causing twining and tangling of the succeeding loops 11 being drawn out into the cylindrical cavity 4.

On the other hand, too small of a wire drawing-out hole of the pressing plate is unfavorable. Namely, it is favorable that the diameter of the wire drawing-out hole is not less than 0.55T+10 (mm), where rupture strength of the welding wire is T (kgf). According to an experiment, if a diameter of the wire drawing-out hole is less than 0.55T+10 (mm) a tendency toward bending the drawn-out welding wire becomes notable. This is caused by the welding wire being bent by the portion 7 of the wire drawing-out hole 6, when the diameter of the wire drawing-out hole 6 is small as compared to the rigidity of the wire. Rigidity of the wire is proportional to the rupture strength of the wire. As a result, a non uniform welding bead may occur, which is caused by swinging of an end of the welding wire extending from a torch in a welding operation.

Moreover, there is a favorable range of weight of the pressing plate 3 of this invention. Namely, a ratio W/T is favorable to be in a range of 4 to 32, where weight of the wire pressing plate is W (g) and rupture strength of the welding wire is T (kgf). If W/T is less than 4, rupture strength or rigidity of the welding wire is too high in comparison to the weight of the pressing plate. Therefore, a large force is exerted in direction A in FIG. 3, and the pressing plate 3 is lifted. Accordingly, upper layers of the coiled wire 2 spring up and twining and tangling of the wire may occur. Contrarily, if W/T exceeds 32, rupture strength or rigidity of the welding wire is too low or the weight of the pressing plate is too large. Therefore, the wire is not able to expand against the inner wall of the pail container, and a loop of wire being drawn out may contact lower loops in parallel. Consequently, lower loops may be drawn out into the cylindrical cavity 4, and twining and tangling of the wire may occur. Moreover, a non-uniform welding bead may occur in some cases as a result of the welding wire 5 being bent by the portion 7 of the wire drawing-out hole 6.

The above explanation is an example of the wire pressing member which includes a circular plate with a wire drawing-out hole in the center. However, the wire pressing member of this invention is not restricted to that shape, as long as it has a part for pressing coiled welding wire, and a part for guiding the welding wire through a central part of the wire pressing member.

Figure 4:
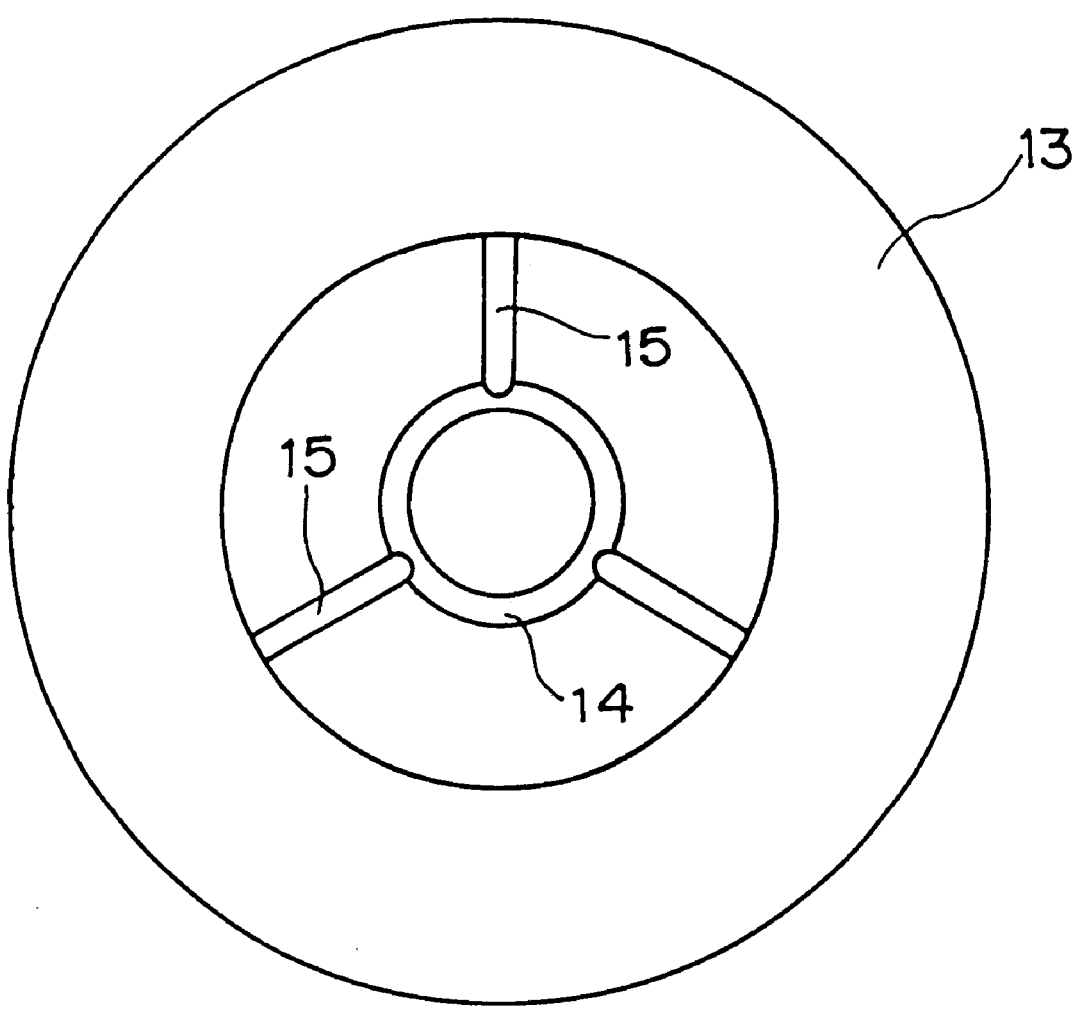
FIG. 4 is a plan view of an another example of the wire pressing member of this invention.
Figure 5:
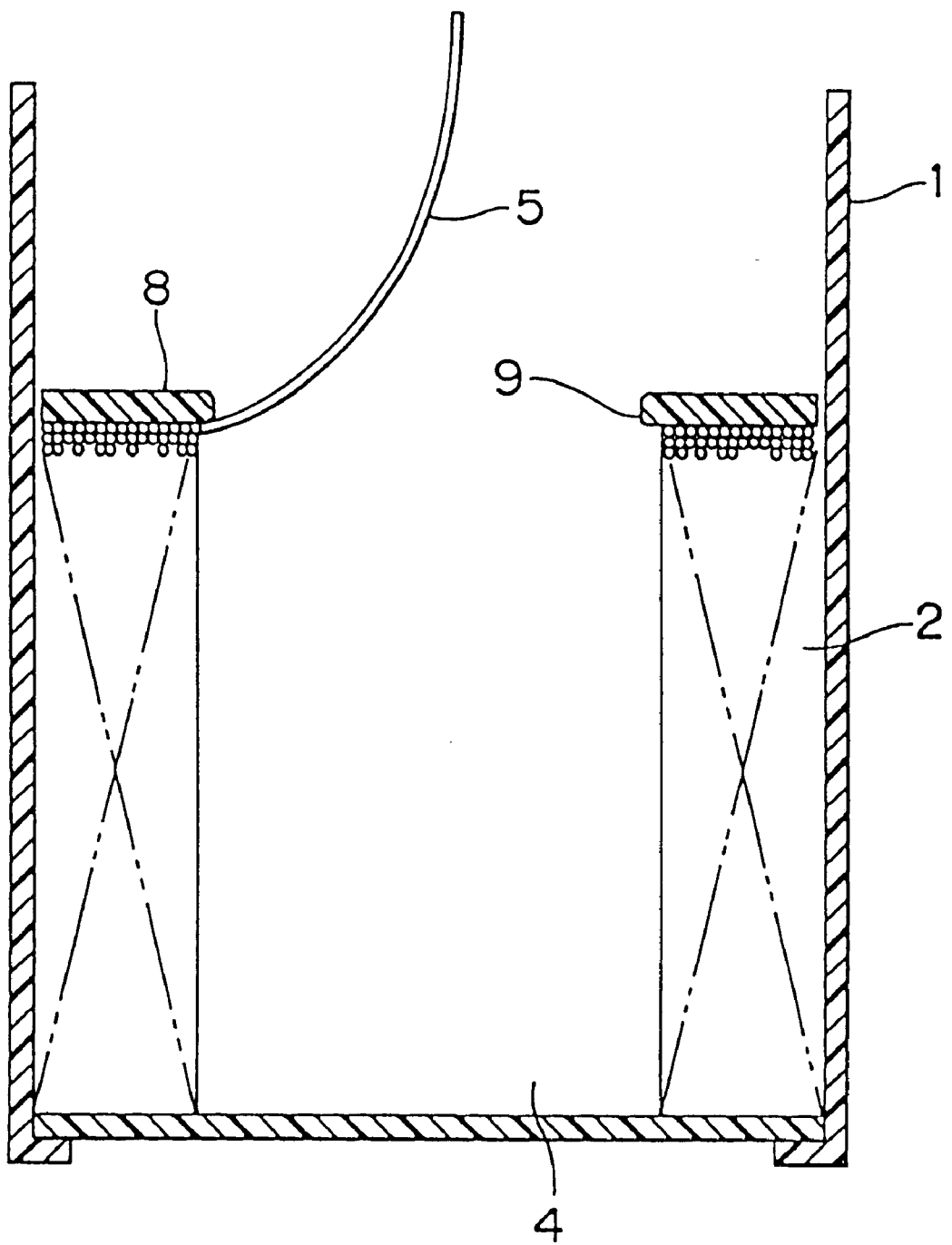
FIG. 5 is a cross-sectional view of a welding wire package of prior art while wire is being drawn out from a pail container.
Figure 6:
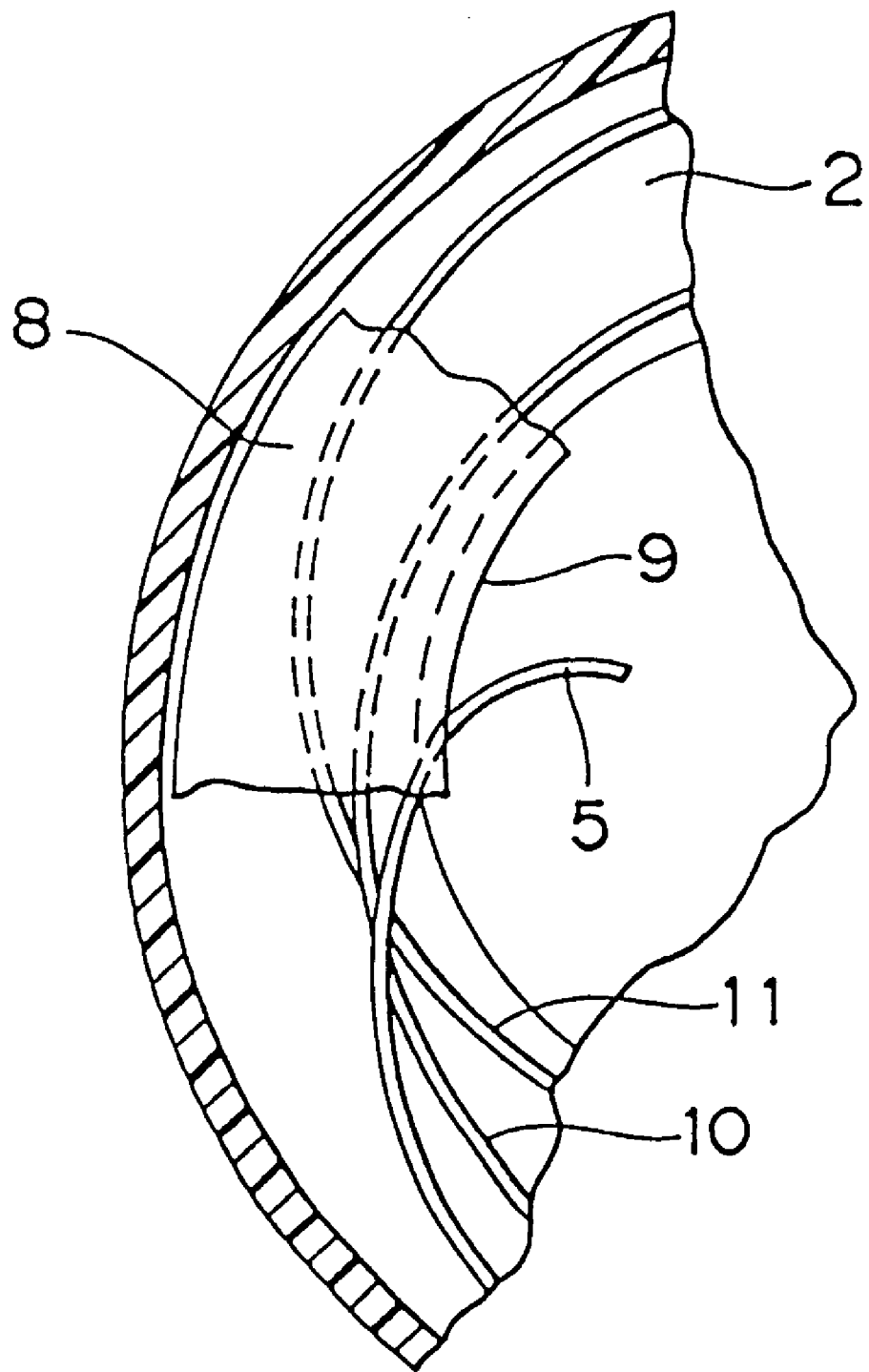
FIG. 6 is a plan view of a part of FIG. 5.

FIG. 4 shows a plan view of an another example of the wire pressing member of this invention, where a ring 14 through which welding wire passes is connected by three supporting rods 15 to the central part of an annular plate 13. This annular plate 13 has a width necessary for pressing coiled wire and has a function of solely pressing coiled wire, like the annular pressing plate 8 in the prior art shown in FIG. 5. The ring 14 is for passage of the welding wire, and thus its inner diameter should satisfy the dimensional conditions of the hole 6 of the wire guiding part of this invention. The wire pressing member in FIG. 4 has the advantage that the condition of the wire in the pail container can be easily inspected, as compared with the pressing plate shown in FIG. 1.

EXAMPLE

Examples of welding wire packages of the present invention will be explained by the following. Solid wire and flux-cored wire of 1.2 mm and 1.6 mm in diameter, which have respective rupture strengths were coiled into loops having torsion of 360 degrees per one turn and filled into pail containers having inner diameters of 500 mm and 650 mm, respectively. Circular plates which have respective wire drawing-out holes of various diameters, and also have respective weights were placed upon the coiled wire. These conditions are shown in Table 1. Also, rupture strength T of the welding wire is an average of five measurements.

Frequency of twining and tangling of the welding wire during drawing out of the welding wire was inspected in each example of No. 1 to No. 8 in Table 1. The testing method required that the welding wire was drawn out continuously for 4 hours at a speed of 15 m per minute from two or three pail containers per each condition. Results are shown together also in Table 1.

TABLE 1

| Test No. | Inner diameter of pail container (mm) | Pressing plate | | Welding wire | | | | | Test results | |
| --- | --- | --- | --- | --- | --- | --- | --- | --- | --- | --- |
| | | Diameter H of drawing-out hole (mm) | Weight W (g) | Kind * | Diameter (mm) | Rupture strength T (kgf) | 0.55T + 10 | W/T | Twining and tangling (times) | Wire condition |
| 1 | 500 | 100 | 1650 | F | 1.2 | 57 | 41 | 28.9 | 0 | Good |
| 2 | 500 | 150 | 1550 | S | 1.6 | 208 | 124 | 7.5 | 0 | Good |
| 3 | 650 | 80 | 1000 | F | 1.6 | 93 | 61 | 10.8 | 0 | Good |
| 4 | 650 | 120 | 1500 | S | 1.2 | 85 | 57 | 17.6 | 0 | Good |

TABLE 1-continued

| Test No. | Inner diameter of pail container (mm) | Pressing plate | | Welding wire | | | | | Test results | |
|---|---|---|---|---|---|---|---|---|---|---|
| | | Diameter H of drawing-out hole (mm) | Weight W (g) | Kind * | Diameter (mm) | Rupture strength T (kgf) | 0.55T + 10 | W/T | Twining and tangling (times) | Wire condition |
| 5 | 500 | 150 | 700 | S | 1.6 | 213 | 127 | 3.3 | 1 | Good |
| 6 | 650 | 70 | 1900 | F | 1.2 | 56 | 41 | 33.9 | 1 | Bent |
| 7 | 650 | 50 | 1200 | S | 1.6 | 156 | 96 | 7.7 | 0 | Bent |
| 8 | 650 | 200 | 1650 | F | 1.2 | 74 | 51 | 22.3 | 3 | Good |

* F: Flux-cored wire
S: Solid wire

As is apparent from Table 1, a wire drawing-out hole of not more than 180 mm in diameter was provided in a central part of the circular pressing plate in each of No. 1 to No. 7. Especially, No. 1 to No. 4 satisfy preferable conditions that the diameter of the hole of the wire guiding part is not less than 0.55T+10 (mm), and also the ratio W/T is in a range of 4 to 32. Therefore, the loop of wire being drawn out was expanded into contact with the inner wall of the pail container, and then the wire traversed across the next loop and the succeeding loops. Thus, neither the next loop nor, of course, the succeeding loops were drawn out into the cylindrical cavity, because the welding wire being drawn out became arched in the cylindrical cavity as a result of the portion 7 of the wire drawing-out hole acting as a fulcrum, and the wire was drawn out while pressing the next loop and the succeeding loops. Consequently, results were very satisfactory in that neither twining nor tangling of the welding wire, nor bending of the welding wire by the portion 7 of the wire drawing-out hole occurred.

On the other hand, in test No. 5 rigidity of the welding wire was too high in comparison with the weight of the pressing plate, resulting in the ratio W/T being too small. Therefore, the pressing plate was lifted, upper layers of the coiled wire sprang up, and twining and tangling of the wire occurred once.

In test No. 6 rigidity of the welding wire was too low in comparison with the weight of the pressing plate, resulting in the ratio W/T being too high. Thus, because a loop of wire being drawn out was not able to expand against the inner wall of the pail container, and was drawn out while in contact with lower layer loops in parallel, the lower layer loops were drawn out into the cylindrical cavity and twining and tangling of the wire occurred once. Moreover, the welding wire was bent by the portion 7 of the wire drawing-out hole.

In test No. 7 the diameter H of the wire drawing-out hole was less than 0.55T+10 (mm). Consequently, because the diameter H of the wire drawing-out hole was small as compared to rupture strength (rigidity) of the wire, the welding wire was bent by the portion 7 of the wire drawing-out hole.

In test No, 8, the diameter of the wire drawing-out hole exceeded 180 mm, the force resulting in the portion 7 of the wire drawing-out hole acting as a fulcrum was small. Therefore, the next loop and the succeeding loops could not be suppressed, and the loop of wire being drawn out touched in parallel with the succeeding loops. Thus, twining and tangling of the wire occurred three times by succeeding loops being drawn out into the cylindrical cavity.

APPLICATION TO INDUSTRIES

Packages of welding wire in the present invention do not result in twining and tangling of the wire even if the welding wire is drawn out at high speed, or rigidity of the welding wire is high. Also, attained is smooth feeding of the welding wire to a welding location without bending of the wire.

What is claimed is:

1. A welding wire package comprising:
 a container;
 a coil of welding wire within said container, with said coil of welding wire defining a substantially cylindrical cavity therethrough, and with said welding wire including a torsion about an axis of said welding wire; and
 a pressing member on a top surface of said coil of welding wire, with said pressing member including an annular plate to exert a force against the top surface of said coil of welding wire, and also including an annular ring that is interconnected to said annular plate and defines an aperture through which the welding wire can be passed, wherein said aperture has a diameter of at most 180 mm and is co-planar with respect to said annular plate.

2. The welding package according to claim 1, wherein the diameter of said aperture is at least 0.55T+10 (mm), with T being equal to the rupture strength of the welding wire in terms of kgf.

3. The welding package according to claim 2, wherein the ratio W/T is between 4 and 32, with W being equal to weight of said pressing member in terms of g.

4. The welding package according to claim 1, wherein the ratio W/T is between 4 and 32, with W being equal to weight of said pressing member in terms of g and T being equal to the rupture strength of the welding wire in terms of kgf.

5. The welding wire package according to claim 1, wherein said aperture is centrally located with respect to said annular plate.

6. The welding wire package according to claim 5, wherein the ratio W/T is between 4 and 32, with W being equal to weight of said pressing member in terms of g and T being equal to the rupture strength of the welding wire in terms of kgf.

7. A welding wire package comprising:
 a container;
 a coil of welding wire within said container, with said coil of welding wire defining a substantially cylindrical cavity therethrough, and with said welding wire including a torsion about an axis of said welding wire; and
 a pressing member on a top surface of said coil of welding wire, with said pressing member including a pressing part to exert a force against the top surface of said coil of welding wire, and also including a guiding part having an aperture through which the welding wire can be passed, wherein said aperture has a diameter of at most 180 mm and is co-planar with respect to said pressing member.

8. The welding package according to claim 7, wherein the diameter of said aperture is at least 0.55T+10 (mm), with T being equal to the rupture strength of the welding wire in terms of kgf.

9. The welding package according to claim 8, wherein the ratio W/T is between 4 and 32, with W being equal to weight of said pressing member in terms of g.

10. The welding package according to claim 7, wherein the ratio W/T is between 4 and 32, with W being equal to weight of said pressing member in terms of g and T being equal to the rupture strength of the welding wire in terms of kgf.

11. The welding package according to claim 5, wherein the diameter of said aperture is at least 0.55T+10 (mm), with T being equal to the rupture strength of the welding wire in terms of kgf.

12. The welding wire package according to claim 11, wherein the ratio W/T is between 4 and 32, with W being equal to weight of said pressing member in terms of g.

13. The welding wire package according to claim 7, wherein said aperture is centrally located with respect to said pressing member.

14. The welding package according to claim 13, wherein the diameter of said aperture is at least 0.55T+10 (mm), with T being equal to the rupture strength of the welding wire in terms of kgf.

15. The welding package according to claim 14, wherein the ratio W/T is between 4 and 32, with W being equal to weight of said pressing member in terms of g.

16. The welding package according to claim 13, wherein the ratio W/T is between 4 and 32, with W being equal to weight of said pressing member in terms of g and T being equal to the rupture strength of the welding wire in terms of kgf.

17. A welding wire package comprising:
   a container;
   a coil of welding wire within said container, with said coil of welding wire defining a substantially cylindrical cavity therethrough, and with said welding wire including a torsion about an axis of said welding wire; and
   a flat circular plate on a top surface of said coil of welding wire, with said flat circular plate including a pressing part to exert a force against the top surface of said coil of welding wire, and also including a guiding part having an aperture through which the welding wire can be passed, wherein said aperture has a diameter of at most 180 mm and is located in and co-planar with said flat circular plate.

18. The welding package according to claim 17, wherein the diameter of said aperture is at least 0.55T+10 (mm), with T being equal to the rupture strength of the welding wire in terms of kgf.

19. The welding package according to claim 18, wherein the ratio W/T is between 4 and 32, with W being equal to weight of said pressing member in terms of g.

20. The welding package according to claim 17, wherein the ratio W/T is between 4 and 32, with W being equal to weight of said pressing member in terms of g and T being equal to the rupture strength of the welding wire in terms of kgf.

21. The welding wire package according to claim 17, wherein said aperture is centrally located in said flat circular plate.

22. The welding package according to claim 21, wherein the diameter of said aperture is at least 0.55T+10 (mm), with T being equal to the rupture strength of the welding wire in terms of kgf.

23. The welding package according to claim 22, wherein the ratio W/T is between 4 and 32, with W being equal to weight of said pressing member in terms of g.

24. The welding package according to claim 21, wherein the ratio W/T is between 4 and 32, with W being equal to weight of said pressing member in terms of g and T being equal to the rupture strength of the welding wire in terms of kgf.

* * * * *